US012719221B2

(12) United States Patent
Li et al.

(10) Patent No.: US 12,719,221 B2
(45) Date of Patent: Aug. 25, 2026

(54) ELECTRICAL CONNECTOR

(71) Applicants: Tyco Electronics (Shanghai) Co., Ltd., Shanghai (CN); Tyco Electronics Japan G.K., Kawasaki (JP)

(72) Inventors: Xinlei (Tony) Li, Shanghai (CN); Hailong (Sanders) Yan, Shanghai (CN); Junya Tsuji, Kawasaki (JP); Masaaki Iwasaki, Kawasaki (JP)

(73) Assignees: Tyco Electronics (Shanghai) Co., Ltd., Shanghai (CN); TE Connectivity Japan G.K., Kawasaki (JP)

( * ) Notice: Subject to any disclaimer, the term of this patent is extended or adjusted under 35 U.S.C. 154(b) by 321 days.

(21) Appl. No.: 18/489,909

(22) Filed: Oct. 19, 2023

(65) Prior Publication Data

US 2024/0136774 A1 Apr. 25, 2024
US 2024/0235127 A9 Jul. 11, 2024

(30) Foreign Application Priority Data

Oct. 19, 2022 (CN) ......................... 202211283044.0

(51) Int. Cl.
*H01R 13/6588* (2011.01)
*H01R 12/71* (2011.01)

(52) U.S. Cl.
CPC ....... *H01R 13/6588* (2013.01); *H01R 12/716* (2013.01)

(58) Field of Classification Search
CPC .............. H01R 13/6588; H01R 12/716; H01R 13/6587; H01R 13/6471; H01R 13/6477; H01R 13/02; H01R 13/502; H01R 13/648; H01R 13/652
See application file for complete search history.

(56) References Cited

U.S. PATENT DOCUMENTS

2024/0113460 A1* 4/2024 Huang .................. H01R 24/60

* cited by examiner

*Primary Examiner* — Joseph Ortega
(74) *Attorney, Agent, or Firm* — Barley Snyder

(57) ABSTRACT

An electrical connector includes an insulation housing, a conductive housing assembled to the insulation housing, a plurality of conductive terminals installed within both the insulation housing and the conductive housing, and a spacer. The plurality of conductive terminals include a plurality of ground terminals in contact with the conductive housing to electrically connect the plurality of ground terminals together. The spacer is connected to the insulation housing such that the conductive housing is positioned between the insulation housing and the spacer. The spacer is formed with a clamping structure clamping the conductive housing and the ground terminals together.

20 Claims, 7 Drawing Sheets

ELECTRICAL CONNECTOR

CROSS-REFERENCE TO RELATED APPLICATION

This application claims the priority benefit of Chinese Patent Application No. 202211283044.0 filed on Oct. 19, 2022, in the China National Intellectual Property Administration, the whole disclosure of which is incorporated herein by reference.

FIELD OF THE INVENTION

Embodiments of the present disclosure generally relate to the field of data communication, and more specifically, to an electrical connector capable of effectively reducing the differential impedance at the solder balls during high-speed signal transmission.

BACKGROUND

With the development of digital information technology, the amount of data transmitted is increasing day by day. For example, in the field of communication, high-speed connectors are required to achieve high-speed signal transmission of at least 112 Gbps. Since data transmission often needs to connect different electrical devices or interfaces through an electrical connector, the signal transmission speed and quality of the electrical connector will greatly affect the speed and stability of data transmission. For example, an electrical connector can be used to make an electrical connection between two printed circuit boards (PCBs).

Applicable electrical connectors usually include conductive terminals installed in an insulation housing and adapted to contact or clamp mating components to provide electrical connections. The conductive terminals include a plurality of ground terminals, a plurality of signal terminals, etc. The plurality of ground terminals are usually connected together through a conductive housing or a conductive layer to provide shielding for the signal terminals. In some conventional technologies, the ground terminals are connected through a conductive housing with a concave-convex structure. When the ground terminals are assembled into the conductive housing, the friction force is very large. This may scratch the metal plating on the conductive housing, causing the risk of disconnection. Further, internal stress generated at the same time will act on the insulation housing, aggravating the warping of the insulation housing during the over-reflow process, which is not conducive to soldering the connector onto the circuit board.

SUMMARY

According to an embodiment of the present disclosure, an electrical connector includes an insulation housing, a conductive housing assembled to the insulation housing, a plurality of conductive terminals installed within both the insulation housing and the conductive housing, and a spacer. The plurality of conductive terminals include a plurality of ground terminals in contact with the conductive housing to electrically connect the plurality of ground terminals together. The spacer is connected to the insulation housing such that the conductive housing is positioned between the insulation housing and the spacer. The spacer is formed with a clamping structure adapted to clamp the conductive housing and the ground terminals together.

BRIEF DESCRIPTION OF THE DRAWINGS

The invention will now be described by way of example with reference to the accompanying Figures, of which.

DETAILED DESCRIPTION OF THE EMBODIMENTS

Figure 1:
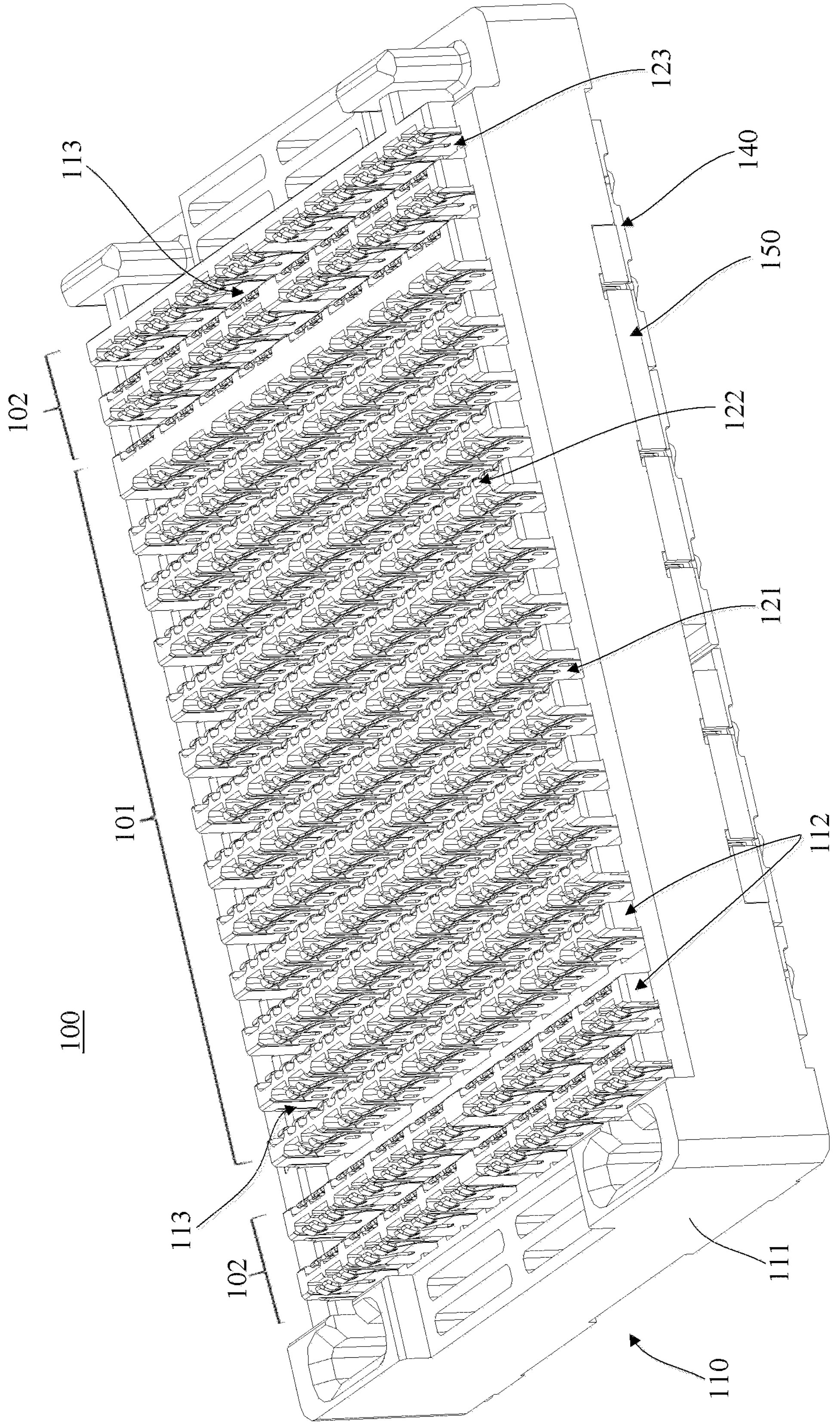
FIG. 1 is a perspective view schematically showing the structure of an electrical connector according to an exemplary embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
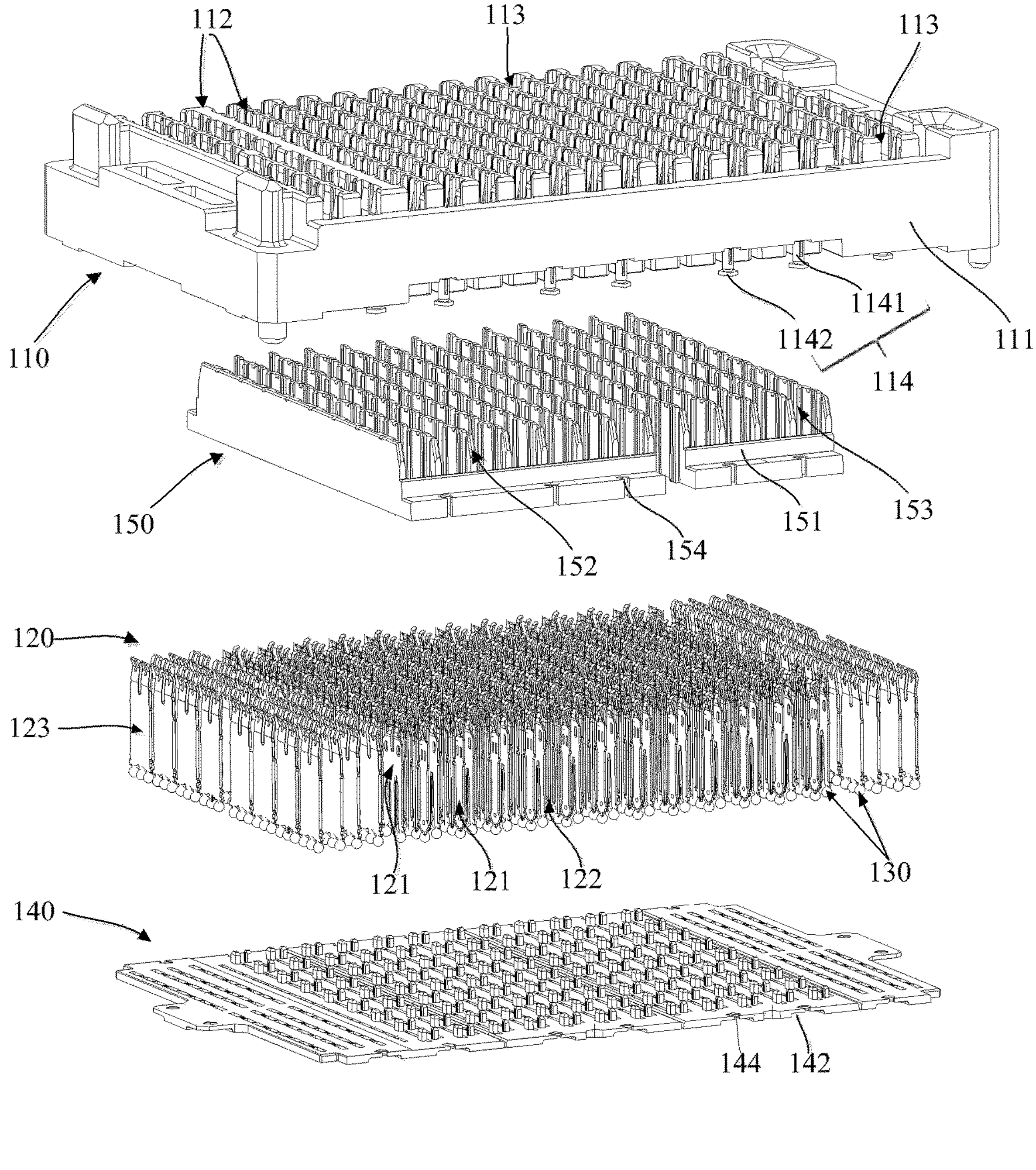
FIG. 2 is an exploded view schematically showing the structure of the electrical connector according to the exemplary embodiment of the present disclosure.

As shown FIGS. 1 and 2, according to an exemplary embodiment of the present disclosure, an electrical connector 100 is provided. The connector 100 is adapted to be connected or installed, by way of example, on a circuit board such as a PCB. The connector 100 is adapted to achieve more reliable signal transmission, such as 112 Gbps or higher speed signal transmission between circuit boards or electrical devices.

As shown in the figures, the electrical connector 100 includes an insulation housing 110 having opposite first and second sides, and an array of a plurality of conductive terminals 120 installed within the insulation housing. Each conductive terminal 120 has a main body segment, and a contact segment 1201 and a solder segment 1202 respectively extending in opposite directions from opposite ends of the main body segment. The contact segment 1201 is at least partially exposed from the first side of the insulation housing 110, for making an electrical contact with a conductive terminal of a mating connector (not shown). The solder segment 1202 is at least partially exposed from the second side of the insulation housing 110. The electrical connector 100 further includes a plurality of solder balls 130. Each solder ball 130 is connected to the solder segment 1202 of a corresponding conductive terminal 120, for making an electrical connection, such as electrical contact or soldering, to a circuit board (not shown).

As shown in FIGS. 1-4, the insulation housing 110 may include a first frame-shaped main body or peripheral wall 111 and a plurality of first partition walls 112 connected at opposite ends thereof to the first frame-shaped main body. The plurality of first partition walls 112 are spaced apart from each other so as to define first terminal installation passages 113 between adjacent first partition walls. The plurality of conductive terminals 120 are arranged in multiple columns, and one or two columns of conductive terminals are installed in each first terminal installation passage 113.

In some embodiments, the plurality of conductive terminals 120 may be arranged in multiple columns within the insulation housing 110. For example, the electrical connector 100 may include a hybrid connector, for instance, the plurality of conductive terminals 120 installed in the insulation housing 110 may also include a plurality of ground terminals 121, a plurality of signal terminals 122 and a plurality of power terminals 123. A plurality of columns of the ground terminals 121 and a plurality of columns of the signal terminals 122 may be arranged within a central region 101 of the electrical connector 100. A plurality of columns of the power terminals 123 may be arranged in an edge region 102 of the electrical connector, as shown in FIG. 1.

In some examples, as shown in FIGS. 1-5 and FIG. 7, the ground terminals 121 and the signal terminals 123 may be alternately arranged in one column or within the same first terminal installation passage 113. For example, the ground terminals 121 and the signal terminals 122 may be alternately arranged in a first column, and some additional ground terminals 121 are arranged in a second column adjacent to the first column. The first column and the second column may be located within the same terminal installation passage or within different terminal installation passages. Depending on actual signal shielding requirements, the structures and arrangements of the ground terminals in the first column and the ground terminals in the second column may be the same or different from each other. By way of example, the signal terminals 123 may include, for example, differential signal terminals, and the plurality of ground terminals 121 are disposed around a pair of differential signal terminals to provide shielding between the pair of differential signal terminals and another adjacent pair of differential signal terminals.

According to an embodiment of the present disclosure, the electrical connector 100 further includes a spacer 140 disposed on the second side of the insulation housing. The spacer 140 includes solid parts positioned between adjacent solder balls 130 to circumferentially surround each solder ball 130 and space the solder balls 130 apart from each other. The spacer 140 comprises a dielectric or insulating member, for example, made of a dielectric material with a dielectric constant greater than the air, such as a plastic sheet or other dielectric material plates. Accordingly, presence of this spacer can effectively reduce the differential impedance of the coupling at the solder balls during high-frequency signal transmission, making signal transmission more stable, and meeting the requirements of at least 112 Gbps high-speed signal transmission.

In an embodiment of the present disclosure, as shown in FIGS. 1-4 and 7, the electrical connector 100 further includes a conductive housing 150. The conductive housing 150 may be positioned between the insulation housing 110 and the spacer 140, and can be assembled to the insulation housing 11, for example, the conductive housing 150 may be at least inserted partially in the insulation housing 110. The plurality of conductive terminals 120 are installed in both the insulation housing 110 and the conductive housing 150. The conductive housing 150 is in contact with the plurality of ground terminals 121 to electrically connect the plurality of ground terminals together. As shown in FIGS. 1 and 2, the conductive housing 150 can be provided only in the central region 101 of the electrical connector 100 where the ground terminals 121 are arranged.

As shown in FIGS. 2-4 and 7, the conductive housing 150 may include a second frame-shaped main body or peripheral wall 151 and a plurality of second partition walls 152 connected at opposite ends thereof to the second frame-shaped main body. The plurality of second partition walls 152 are spaced apart from each other so as to define second terminal installation passages 153 between adjacent second partition walls 152. Each second terminal installation channel 153 is aligned with the corresponding first terminal installation channel 113 in a thickness direction. In this way, one or two columns of conductive terminals 120 are installed in the first terminal installation passage 113 and the second terminal installation passage 153 and are aligned.

As an example, the conductive housing 150 may be formed by Physical Vapor Deposition (PVD) technology or Moulded Interconnect Device (MID) technology and assembled on the insulation housing 110. Here, the MID technology refers to the technology of manufacturing or installing the components with electrical functions on the surface of the injection-molded plastic housing, so as to combine the electrical interconnection function of the components and the mechanical support function of the plastic housing. Of course, in other embodiments, other technologies that can metalize the plastic surface may also be used to form the conductive housing over the insulation housing.

Figure 3:
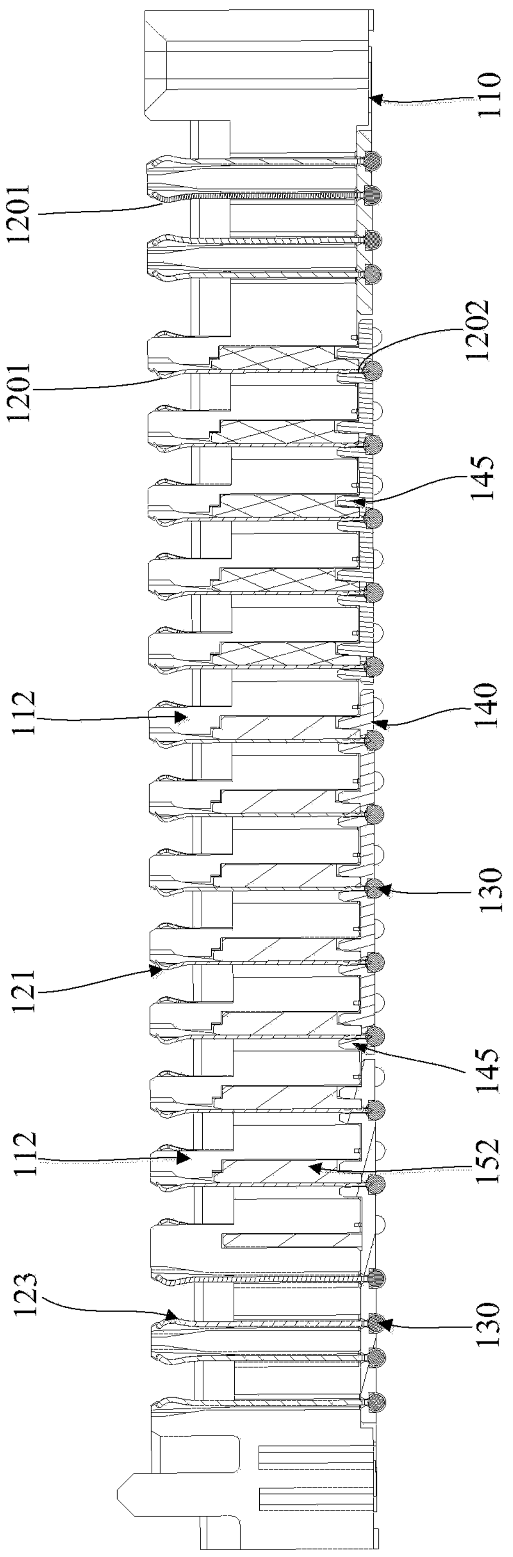
FIG. 3 is a cross-sectional view schematically showing the structure of the electrical connector according to the exemplary embodiment of the present disclosure.
Figure 4:
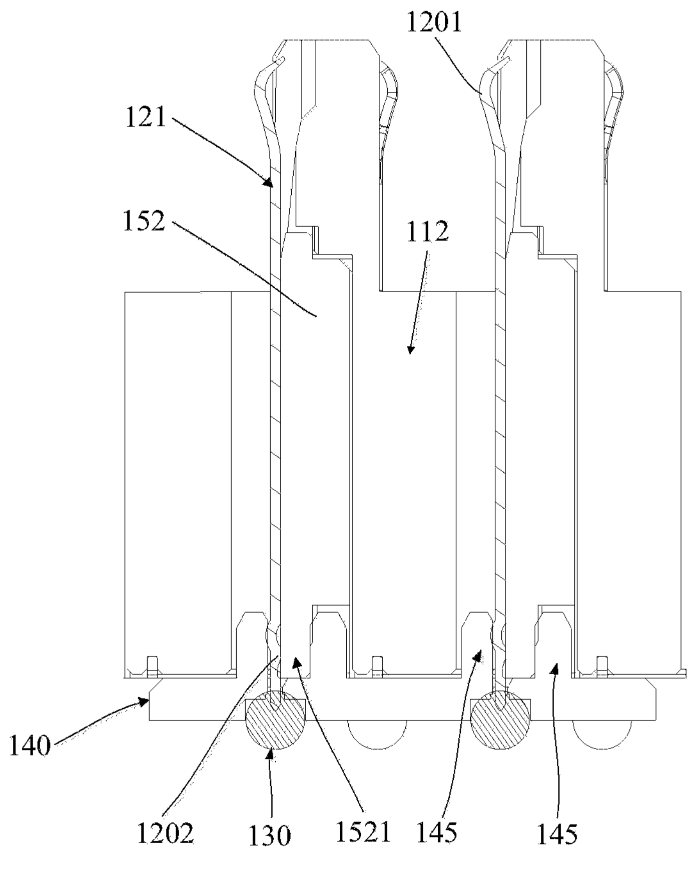
FIG. 4 is a partially enlarged, cross-sectional view schematically showing the structure of a portion of the electrical connector according to the exemplary embodiment of the present disclosure.
Figure 5:
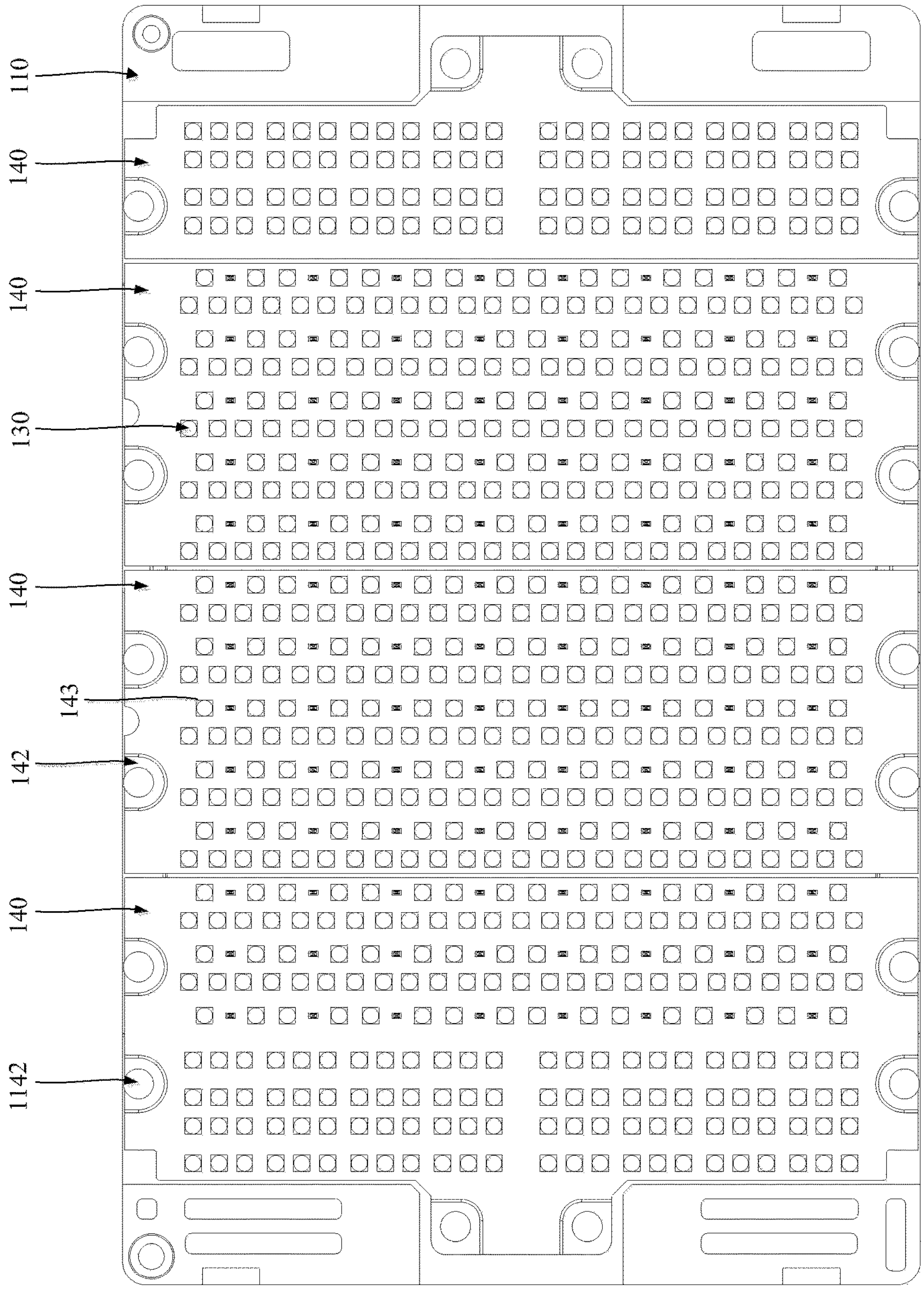
FIG. 5 is a rear view schematically showing the structure of the electrical connector according to the exemplary embodiment of the present disclosure.

In an exemplary embodiment, as shown in FIGS. 3-5, the spacer 140 may be a plate-shaped member with a plurality of spaced receiving holes 143. Each solder ball 130 is received in one receiving hole 143 and has a soldering portion exposed from the receiving hole to be soldered on a circuit board. In some examples, the portion of each solder ball 130 connected to the solder segment 1202 is at least positioned within the receiving hole 143. For example, except the soldering portion, other portions of the solder ball 130 are received or enclosed in the corresponding receiving hole 143. In this way, the respective solder balls are spaced apart from each other, and the differential impedance of coupling between them can be reduced during signal transmission. As an example, the receiving hole 143 may include a circular hole, a square hole, or other polygonal holes penetrating through the spacer 140 in the thickness direction, but the present disclosure is not limited thereto.

In some examples, the spacer 140 may abut against the first frame-shaped body 111 and/or the first partition wall 113 of the insulation housing 110. In some embodiments, as shown in FIGS. 2, 3 and 5, the electrical connector 100 may include one or more spacers 140 adjacently disposed on the second side of the insulation housing 110.

According to an exemplary embodiment of the present disclosure, as shown in FIGS. 2-4 and 6, the spacer 140 is formed with a clamping structure 145 configured and arranged to clamp the conductive housing 150 and the ground terminals 121 together. In this way, the ground terminal 121 can be in close contact with the conductive housing 150, for example, can be in close contact with the side face of the second partition wall 152, so as to provide a reliable shielding effect for the signal terminals. Thus, after the respective conductive terminals including the ground terminals are assembled into the insulation housing and the conductive housing, the spacer is assembled into the insulation housing so that the clamping structures arranged in the shape of a clip clamp the conductive housing and the ground terminals in a manner that the conductive housing and the ground terminals are in close contact to ensure reliable shielding performance.

For example, the ground terminal 121 may be held at least partially in planar contact with the conductive housing 150 by the clamping structure 145, so that there is no need to provide an additional concave-convex structure on the conductive housing to hold the ground terminals. This avoids damage to the ground terminals or the conductive layer of the conductive structures caused by excessive friction force of assembling the ground terminals, thereby avoiding the risk of disconnection and also avoiding the internal stress caused by excessive friction force on the insulation housing. This also prevents or reduces the warping or deformation of the insulation housing in the reflow process.

Figure 7:
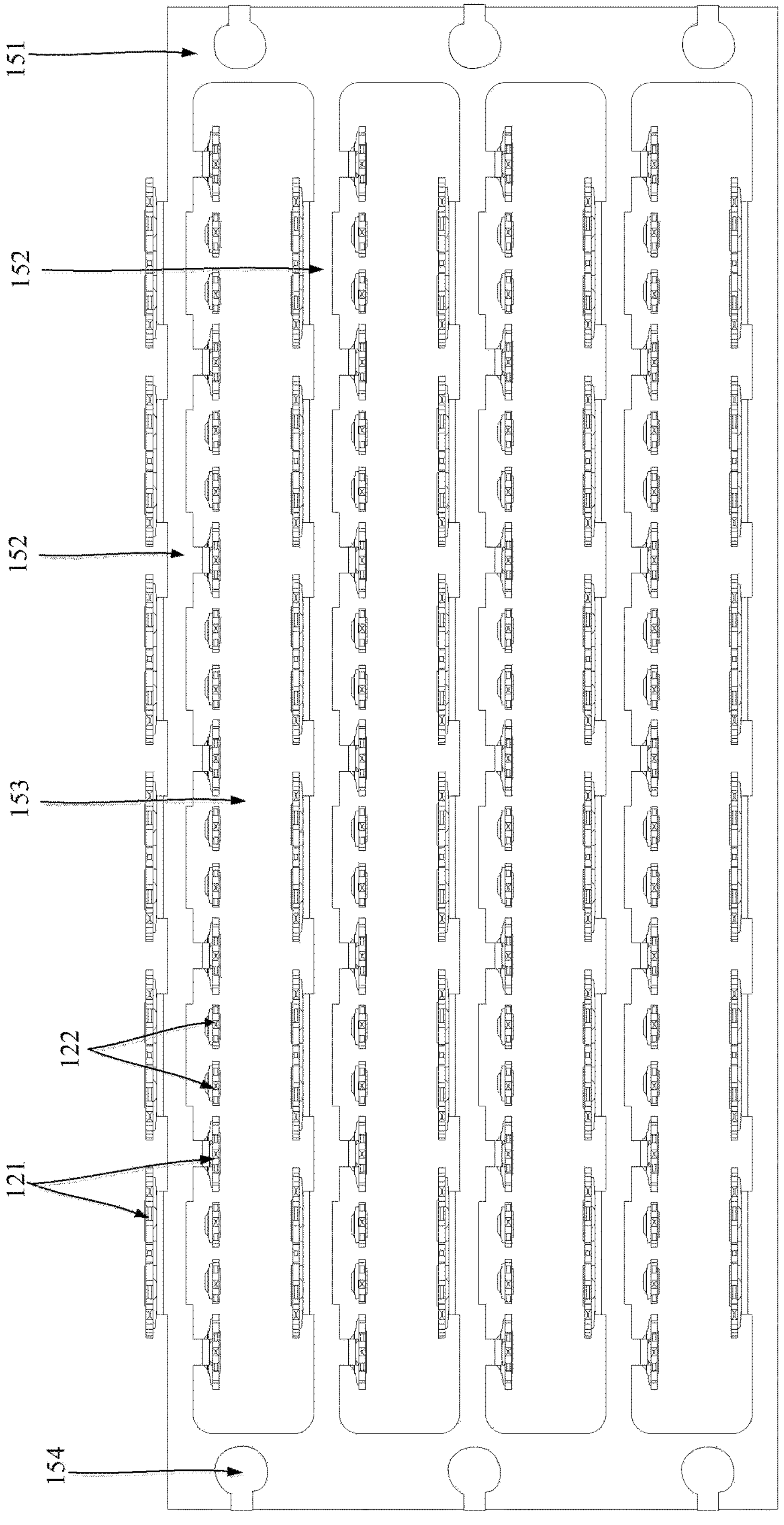
FIG. 7 is a top view schematically showing the structure of a conductive housing assembled with conductive terminals of the electrical connector according to an exemplary embodiment of the present disclosure.

In the embodiment shown in FIGS. 2, 4 and 7, a plurality of clamping structures 145 are formed on a side of the spacer 140 facing the conductive housing 150 or the insulation housing 110. At least a portion of each ground terminal 121 and at least a portion of the conductive housing 150 are clamped between an adjacent pair of clamping structures 145, so that the ground terminal is kept in contact with the conductive housing 150. For example, corresponding to multiple-columns arrangement of the ground terminals 121, the plurality of clamp structures 145 may also be arranged in multiple columns, so that one column of ground terminals is inserted and clamped between adjacent columns of the clamp structures.

As an example, the clamping structure may include a protrusion (e.g., a cylinder liking a quadrangular prism or a polygonal cylinder) extending from the main body of the spacer 140 (e.g., from the side of the spacer facing the conductive housing 150 or the insulation housing 110) toward the conductive housing 150. The protrusion may be extended or inserted into the conductive housing. In some examples, at least a portion of a surface of at least one clamping structure in the adjacent pair of clamping structures facing the ground terminal 121 is a flat face that abuts against the surface of the ground terminal 121 to press the ground terminal 121 against the conductive housing 150 (for example, against the side of the second partition wall 152 of the conductive housing 150). By way of example, at least one of two opposite sides of the second partition wall 152 has a flat portion that can make planar contact with the ground terminal 121. Alternatively or additionally, a protruding structure for installation of the ground terminal may also be formed on the side face of the second partition wall.

As shown in FIGS. 3 and 4, flanges 1521 may be formed on the side of the conductive housing 150 or its second partition wall 152 facing the spacer. Each flange 1521 and at least a portion of the solder section 1202 of each corresponding ground terminal 121 are clamped between the adjacent pair of clamping structures 145. As an example, as shown in FIG. 4, at least a portion of the solder section 1202 to be clamped may include a concavo-convex structure, so as to enhance the clamping of the solder section by the clamping structure.

As shown in FIGS. 2-4 and 6, the spacer 140 is formed with a slot 141 between the adjacent pair of clamping structures 145, and the solder segment 1202 of the conductive terminal 120 is inserted through the slot, for connection to the solder ball 130. In some embodiments, one clamping structure of the adjacent pair of clamping structures 145 is adjacent to a corresponding slot 141, and the other clamping structure is spaced apart from the corresponding slot 141. In this way, a soldering portion of the ground terminal 121 passes through the slot 141 and the flanges 1521 of the conductive housing 150 abut against a portion of the spacer 140 between the slot and the other clamping structure 145.

Figure 6:
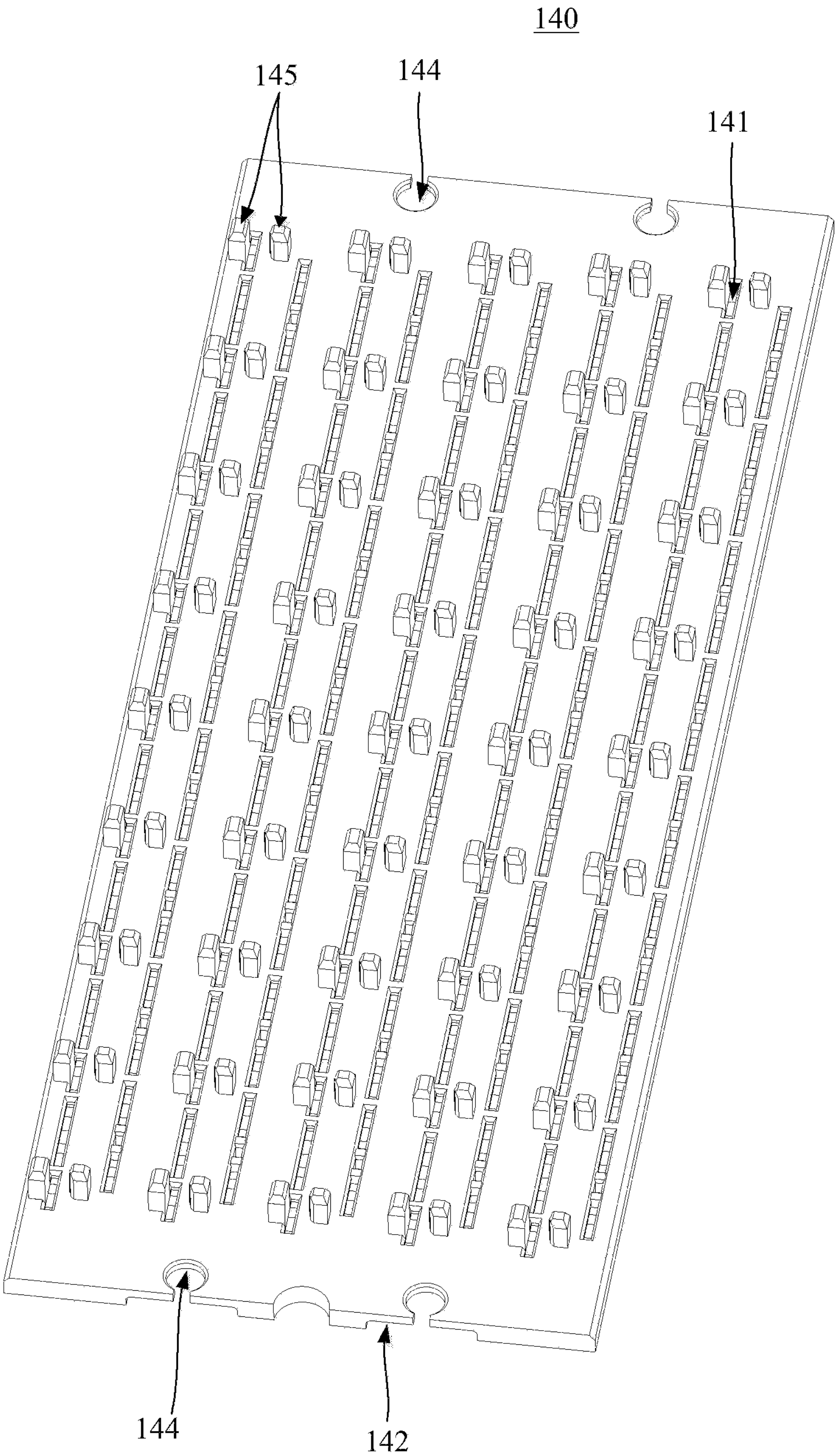
FIG. 6 is a top perspective view schematically showing the structure of a spacer of the electrical connector according to an exemplary embodiment of the present disclosure.

In some embodiments, as shown in FIG. 6, a plurality of clamping structures 145 arranged in multiple columns are formed or arranged on the side of the spacer 140 facing the conductive housing 150. The clamping structures 145 in each column of clamping structures are spaced apart from each other in a column direction. A plurality of slots 141 spaced apart and arranged in a column are formed between two adjacent columns of clamping structures 145.

In some embodiments, as enlarged in FIG. 4, a gap may exist between the clamping structure 145 and the insulation housing 110. In this way, it is possible to avoid generation of the internal stress on the insulation housing 110 due to interference between the clamping structure 145 and the insulation housing, so as to prevent or reduce the warping or deformation of the insulation housing in the reflux process.

In some embodiments, the spacer 140 and the insulation housing 110 are assembled together so that they are fixed relative to each other, to firmly hold the conductive terminals and the conductive housing. For example, the spacer 140 and the insulation housing 110 are detachably connected to each other. As an example, one of the spacer and the insulation housing may be formed or provided with a fastening structure while the other is formed with a connection hole in which the fastening structure is assembled to secure the spacer and the insulation housing together.

In the embodiment shown in FIGS. 1-5, the insulation housing 110 is provided or formed with a fastening structure 114 on the second side facing the spacer 140, and the spacer 140 is formed with the connection hole 144. Exemplarily, the fastening structure may include a rod portion 1141 extending from the second side of the insulation housing 110 toward the spacer 140 and a head 1142 located at an end of the rod portion. The rod portion 1141 is inserted through the connection hole 144. A diameter of the head 1142 is larger than that of the connection hole 144, and the head 1142 is positioned on a side of the spacer 140 facing away from the insulation housing 110. In this way, engagement of the fastening structure 114 and the connection hole 144 can make the spacer 140 and the insulation housing 110 being held together and fixed relative to each other.

As an example, the fastening structure 114 may be formed or provided at an edge position of the second side or surface of the insulation housing 110, and the connection hole 144 is formed at a corresponding edge position of the spacer 140, to facilitate the engagement therebetween.

The fastening structure 114 may be integrated with the insulation housing 110, or be formed individually and installed to the insulation housing. For example, in some examples, the insulation housing 110 is initially formed a pillar body at the edge position or other appropriate positions. After assembling the spacer 140 into the insulation housing 110, the pillar body is inserted into the connection hole 144 formed within the spacer. Then, a part of the pillar body on the side of the connection hole 144 facing away from the insulation housing 110 is melted through thermal riveting or hot melt, to form a large-diameter disk-like part or head 1142 so as to fix the spacer to the insulation housing.

In other examples, as shown in FIGS. 2-5, the connection hole 144 has a notch or is open at its edge side, so that the small-diameter rod portion 1141 can be squeezed into or assembled in the connection hole 144 through the notch. The large-diameter head 1142 does not need to pass through the small-diameter connection hole 144, but is directly located on the side of the spacer 140 or the connection hole facing away from the insulation housing 110. Therefore, the spacer 140 can be easily assembled and fixed to the insulation housing 110, which can effectively prevent the spacer 140 from being separated from the insulation housing in the thickness or stack direction of the electrical connector.

As shown in FIGS. 2-5, the side of the spacer 140 facing away from the insulation housing 110 is formed with a recess 142. The recess 142 is in communication with the connection hole 144 and has an inner diameter greater than the connection hole so as to accommodate the large-diameter head 1142 of the fastening structure 114.

Additionally or alternatively, the spacer and the insulation housing may also be fixedly or detachably connected or assembled together with each other by fasteners. For example, suitable fasteners may include fixtures, screws, or other threaded connections, but the present disclosure is not limited thereto.

As shown in FIGS. 2, 4 and 7, the conductive housing 150 may also be formed with the connection hole 154, for example at the edge position of its second frame-shaped main body 151. This facilitates engagement with the fastening structure 114, so that the insulation housing 110, the conductive housing 150 and the spacer 140 may be sequentially stacked and assembled fixedly relative to each other.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An electrical connector, comprising:

an insulation housing;

a conductive housing assembled with the insulation housing;

a plurality of conductive terminals installed within both the insulation housing and the conductive housing and including a plurality of ground terminals in contact with the conductive housing to electrically connect the plurality of ground terminals together; and a spacer connected to the insulation housing such that the conductive housing is positioned between the insulation housing and the spacer, the spacer formed with a clamping structure adapted to clamp the conductive housing and the ground terminals together.

2. The electrical connector according to claim 1, wherein a plurality of the clamping structures are formed on a side of the spacer facing the conductive housing, and at least a portion of each ground terminal and at least a portion of the conductive housing are clamped between an adjacent pair of the clamping structures.

3. The electrical connector according to claim 2, wherein each ground terminal is held at least partially in planar contact with the conductive housing by the clamping structure.

4. The electrical connector according to claim 2, wherein the spacer includes a plate-shaped main body, and the clamping structure includes a protrusion extending from the plate-shaped main body toward the conductive housing.

5. The electrical connector according to claim 4, wherein at least a portion of a surface of at least one clamping structure in the adjacent pair of clamping structures facing the ground terminal is a flat face.

6. The electrical connector according to claim 1, wherein:

the conductive housing is inserted in the insulation housing and includes a frame-shaped main body and a plurality of partition walls connected at opposite ends thereof to the frame-shaped main body;

the plurality of partition walls are spaced apart from each other and define terminal installation passages between adjacent second partition walls;

the plurality of conductive terminals are arranged in multiple columns, with at least one column of conductive terminals installed in each terminal installing channel; and the ground terminal is in contact with a side face of the partition wall.

7. The electrical connector according to claim 6, wherein at least one of two opposite sides of the partition wall has a flat portion in planar contact with the ground terminal.

8. The electrical connector according to claim 1, wherein a gap is formed between the clamping structure and the insulating housing.

9. The electrical connector according to claim 1, wherein the electrical connector comprises a plurality of the spacers adjacently arranged on the second side of the insulation housing.

10. The electrical connector according to claim 1, wherein the plurality of conductive terminals further include at least one of a signal terminal or a power terminal, and the signal terminal or the power terminal is provided between adjacent ground terminals.

11. The electrical connector according to claim 1, wherein the conductive housing is position between the insulation housing and the spacer in a direction of mating between the plurality of conductive terminals and a corresponding plurality of mating terminals.

12. The electrical connector according to claim 11, wherein the spacer includes a plurality of the clamping structures, each adapted to be inserted into the insulation housing and the conductive housing in direction opposite to the direction of mating.

13. An electrical connector, comprising:

an insulation housing having opposite first and second sides;

a conductive housing assembled with the insulation housing;

a plurality of conductive terminals installed within both the insulation housing and the conductive housing and including a plurality of ground terminals in contact with the conductive housing to electrically connect the plurality of ground terminals together, each conductive terminal has a main body segment, and a contact segment and a solder segment positioned at opposite ends of the main body segment, the contact segment being at least partially exposed from the first side, the solder segment being at least partially exposed from the second side;

a spacer connected to the insulation housing such that the conductive housing is positioned between the insulation housing and the spacer, the spacer formed with a plurality of clamping structures adapted to clamp the conductive housing and the ground terminals together, the plurality of the clamping structures are formed on a side of the spacer facing the conductive housing, and at least a portion of each ground terminal and at least a portion of the conductive housing are clamped between an adjacent pair of the clamping structures, the spacer is formed with a slot between the adjacent pair of clamping structures, and the solder segment is inserted through the slot; and flanges formed on the side of the conductive housing facing the spacer, each flange of the conductive housing and at least a portion of the solder section of each ground terminal are clamped between the adjacent pair of clamping structures.

14. The electrical connector according to claim 13, wherein one clamping structure of the adjacent pair of clamping structures is adjacent to a corresponding slot, and another clamping structure of the adjacent pair of clamping structures is spaced apart from the corresponding slot, a soldering portion of the ground terminal passes through the slot and the flanges of the conductive housing abut against a portion of the spacer between the slot and the other clamping structure.

15. The electrical connector according to claim 13, wherein:

a plurality of clamping structures are formed on a side of the spacer facing the conductive housing and arranged in multiple columns, the clamping structures in each column of clamping structures being spaced apart from each other in a column direction; and a plurality of the slots are formed between two adjacent columns of clamping structures, spaced apart from each other and arranged in a column.

16. The electrical connector according to claim 13, wherein:

the electrical connector further comprises a plurality of solder balls, each solder ball being connected to the solder segment of a corresponding conductive terminal; and the spacer is a plate-shaped member having a plurality of spaced receiving holes, each solder ball is received in one receiving hole and has a soldering portion exposed from the receiving hole to be soldered on a circuit board.

17. An electrical connector, comprising:

an insulation housing;

a conductive housing assembled with the insulation housing;

a plurality of conductive terminals installed within both the insulation housing and the conductive housing and including a plurality of ground terminals in contact with the conductive housing to electrically connect the plurality of ground terminals together; and a spacer connected to the insulation housing such that the conductive housing is positioned between the insulation housing and the spacer, the spacer formed with a clamping structure adapted to clamp the conductive housing and the ground terminals together, wherein one of the spacer or the insulation housing is provided with a fastening structure, and the other one of the spacer or the insulation housing is formed with a connection hole in which the fastening structure is assembled to fix the spacer and the insulation housing together.

18. The electrical connector according to claim 17, wherein:

the insulation housing is provided with the fastening structure on the second side facing the spacer, and the spacer is formed with the connection hole; and the fastening structure comprises a rod portion extending from the second side toward the spacer and a head located at an end of the rod portion, the rod portion is inserted through the connection hole, a diameter of the head is larger than that of the connection hole, and the head is positioned on a side of the spacer facing away from the insulation housing.

19. The electrical connector according to claim 18, wherein the fastening structure is provided at an edge position of the second side, and the connection hole is formed at an edge position of the spacer.

20. The electrical connector according to claim 19, wherein the side of the spacer facing away from the insulation housing is formed with a recess communicating with the connection hole and accommodating the head therein.

* * * * *